(12) United States Patent
Kobayashi et al.

(10) Patent No.: US 11,496,027 B2
(45) Date of Patent: Nov. 8, 2022

(54) MOTOR

(71) Applicant: NIDEC SERVO CORPORATION, Gunma (JP)

(72) Inventors: Toru Kobayashi, Gunma (JP); Yoshifumi Kuwano, Gunma (JP)

(73) Assignee: NIDEC SERVO CORPORATION, Gunma (JP)

( * ) Notice: Subject to any disclaimer, the term of this patent is extended or adjusted under 35 U.S.C. 154(b) by 519 days.

(21) Appl. No.: 16/583,275

(22) Filed: Sep. 26, 2019

(65) Prior Publication Data

US 2020/0106348 A1 Apr. 2, 2020

(30) Foreign Application Priority Data

Sep. 28, 2018 (JP) .............................. JP2018-185705
Aug. 7, 2019 (JP) .............................. JP2019-145030

(51) Int. Cl.
| | |
|---|---|
| *H02K 15/02* | (2006.01) |
| *H02K 1/04* | (2006.01) |
| *H02K 5/04* | (2006.01) |
| *H02K 49/04* | (2006.01) |
| *H02K 1/14* | (2006.01) |
| *H02K 5/08* | (2006.01) |

(52) U.S. Cl.
CPC .............. *H02K 15/028* (2013.01); *H02K 1/04* (2013.01); *H02K 1/14* (2013.01); *H02K 5/04* (2013.01); *H02K 5/08* (2013.01); *H02K 49/043* (2013.01)

(58) Field of Classification Search
CPC .. H02K 5/02; H02K 5/08; H02K 5/04; H02K 15/028; H02K 1/04; H02K 1/14
See application file for complete search history.

(56) References Cited

U.S. PATENT DOCUMENTS

2015/0188383 A1\* 7/2015 Okada ...................... H02K 5/24
310/43
2020/0021161 A1\* 1/2020 Yamamoto ............. H02K 5/225

FOREIGN PATENT DOCUMENTS

JP 2013150520 8/2013

\* cited by examiner

*Primary Examiner* — Livius R. Cazan
(74) *Attorney, Agent, or Firm* — JCIPRNET

(57) ABSTRACT

A motor case has a first case portion and a second case portion coupled to the first case portion. The stator has a stator core and an insulator fixed to the stator core. The insulator has a tubular portion having an outer circumferential surface and a polygonal shape in the cross-sectional view, and on the outer circumferential surface, insulator flat portions lined up in a circumferential direction. The first case portion includes: three or more core supports which project inward in the radial direction from an inner circumferential surface of a circumferential wall of the first case portion, come into contact with the core outer-circumferential surface, and are disposed at intervals from each other in the circumferential direction; and at least one first detent which is in contact with or is disposed to come into contact with the insulator flat portion.

21 Claims, 6 Drawing Sheets

MOTOR

CROSS-REFERENCE TO RELATED APPLICATION

This application claims the priority benefit of Japan Patent Application No. 2018-185705, filed on Sep. 28, 2018 and Japan application serial No. 2019-145030, filed on Aug. 7, 2019. The entirety of the above-mentioned patent application is hereby incorporated by reference herein and made a part of this specification.

BACKGROUND OF THE DISCLOSURE

Technical Field

The disclosure relates to a motor.

Related Art

A motor includes a rotor, a stator, a circuit board, and a motor case. Patent literature 1 discloses a motor including a housing made of resin.

LITERATURE OF RELATED ART

Patent Literature

[Patent literature 1] Japanese Laid-Open No. 2013-150520

When a motor case made of resin is used, it is difficult to stably perform position alignment of the motor case and the stator and to inhibit relative rotation (idling) between the motor case and the stator.

With consideration for the circumstance described above, an objective of the disclosure is to provide a motor capable of stably performing position alignment of a motor case and a stator and inhibiting idling.

SUMMARY

A motor of the disclosure includes: a rotor centered on a central axis; a stator facing the rotor in a radial direction; a circuit board electrically connected to the stator; and a motor case that accommodates the rotor, the stator, and the circuit board. The motor case has a first case portion having a bottomed tubular shape which is made of resin and in which at least the rotor and the stator are disposed, and a second case portion having a topped tubular shape which faces the first case portion from one side in an axial direction and is coupled to the first case portion. The stator has a stator core which surrounds the rotor from an outer side in the radial direction and in which a core outer-circumferential surface has a circular shape in a cross-sectional view perpendicular to the central axis, and an insulator which is fixed to the stator core. The insulator has a tubular portion which extends further than the stator core toward one side in the axial direction and is centered on the central axis. An outer circumferential surface of the tubular portion has a polygonal shape in the cross-sectional view. The tubular portion has, on the outer circumferential surface, a plurality of insulator flat portions lined up in a circumferential direction. The first case portion has three or more core supports which project inward in the radial direction from an inner circumferential surface of a circumferential wall of the first case portion, come into contact with the core outer-circumferential surface, and are disposed at intervals from each other in the circumferential direction, and at least one first detent which projects inward in the radial direction from the inner circumferential surface of the circumferential wall and which is in contact with or is disposed to come into contact with the insulator flat portion.

DESCRIPTION OF THE EMBODIMENTS

Figure 1:
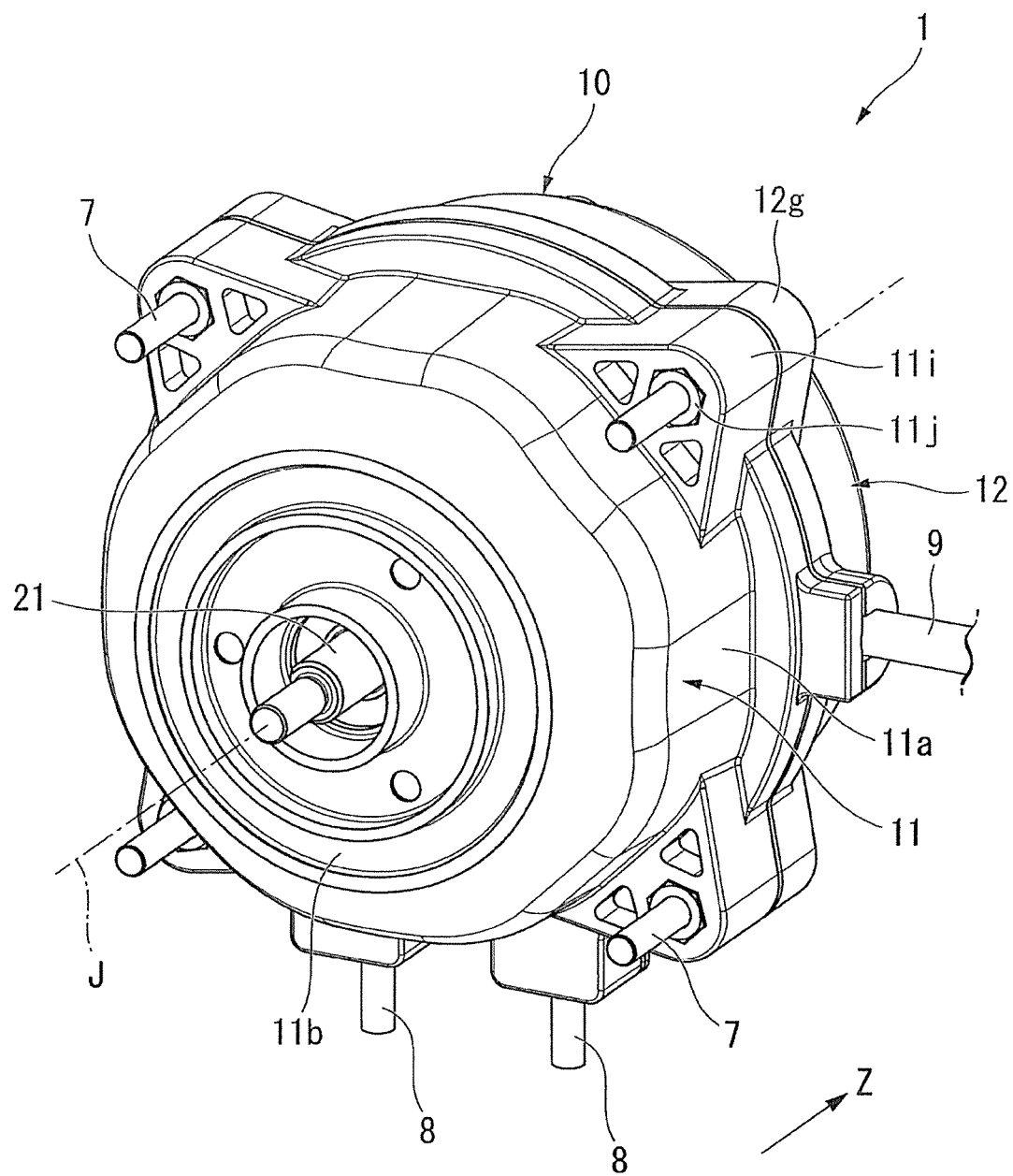
FIG. 1 is a perspective view illustrating a motor of an embodiment.

According to a motor of the disclosure, it is possible to stably perform position alignment of a motor case and a stator, and it is possible to inhibit idling.

A motor 1 of an embodiment of the disclosure is described with reference to the drawings. The motor 1 of the embodiment is a motor which drives, for example, a fan of a refrigerator, a freezer, or the like. The motor 1 is an eight-pole/eight-slot single-phase motor for example. The motor 1 has a central axis J. In the drawings, the central axis J extends along a Z-axial direction. The Z-axial direction is, for example, a vertical direction when the motor 1 is assembled; however, the Z-axial direction may be the vertical direction, a horizontal direction, or another direction, when the motor 1 is installed in an apparatus to be used.

In the following description, unless otherwise described, a direction parallel to the central axis J is simply referred to as an "axial direction". A radial direction around the central axis J is simply referred to as a "radial direction". Of the radial direction, a direction of approaching the central axis J is referred to as an inner side in the radial direction, and a direction of being separated from the central axis J is referred to as an outer side in the radial direction. A circumferential direction around the central axis J, that is, rotation around the central axis J, is simply referred to as a "circumferential direction". Moreover, in the embodiment, a "parallel direction" includes a substantially parallel direction, and an "orthogonal direction" includes a substantially orthogonal direction.

As illustrated in FIGS. 1-6, the motor 1 includes a rotor 2 centered on the central axis J, a plurality of bearings 24 and 25, a stator 3, a circuit board 5, a motor case 10, a plurality of fastening screws 7, and a wiring member 9. An axial position of the stator 3 is different from an axial position of the circuit board 5. In the embodiment, of the axial direction, a direction directed from the stator 3 toward the circuit board 5 is referred to as one side (+Z side) in the axial direction, and a direction directed from the circuit board 5 toward the stator 3 is referred to as the other side (−Z side) in the axial direction.

The rotor 2 has a shaft 21, a rotor core 22, and a magnet (not illustrated). The shaft 21 extends in the axial direction with the central axis J as a center. The shaft 21 is supported by the plurality of bearings 24 and 25 arranged at the motor case 10 to freely rotate around the central axis J. In the embodiment, the bearings 24 and 25 are arranged as a pair and are separated from each other in the axial direction. The bearings 24 and 25 are ball bearings or the like, for example.

The rotor core 22 has an annular shape centered on the central axis J. In the embodiment, the rotor core 22 has a tubular shape. The rotor core 22 is disposed at an outer side in the radial direction from the shaft 21. An inner circumferential surface of the rotor core 22 is fixed to an outer circumferential surface of the shaft 21. The rotor core 22 is rotated around the central axis J together with the shaft 21. Although not illustrated, the magnet is disposed on an outer circumferential surface of the rotor core 22. A plurality of magnets are arranged to be lined up in a circumferential direction. Moreover, the magnet may be a ring magnet having a cylindrical shape centered on the central axis J.

The stator 3 is disposed at an outer side in the radial direction from the rotor 2. The stator 3 surrounds the rotor core 22 over an entire circumference in the circumferential direction from an outer side in the radial direction. The stator 3 faces the magnet of the rotor 2 via a gap in the radial direction. In other words, the stator 3 faces the rotor 2 in the radial direction. The stator 3 has a stator core 31, an insulator 32, and a plurality of coils 33.

The stator core 31 has an annular shape centered on the central axis J. The stator core 31 is disposed at an outer side in the radial direction from the rotor 2. The stator core 31 surrounds the rotor 2 from the outer side in the radial direction. The stator core 31 is, for example, a steel-sheet stack configured by stacking a plurality of electromagnetic steel sheets in the axial direction.

The stator core 31 has a core back 31a, a first groove portion 31d, and a plurality of teeth 31b. The core back 31a has an annular shape centered on the central axis. The core back 31a has a cylindrical shape extending in the axial direction. A core outer-circumferential surface 31c of the core back 31a has a circular shape in a cross-sectional view perpendicular to the central axis J (hereinafter, simply referred to as a "cross-sectional view" in some cases). In other words, the core outer-circumferential surface 31c of the stator core 31 has a circular shape in the cross-sectional view.

The first groove portion 31d is recessed inward in the radial direction from the core outer-circumferential surface 31c and extends in the axial direction. The first groove portion 31d extends over an entire length of the core outer-circumferential surface 31c in the axial direction. The first groove portion 31d is disposed to overlap the teeth 31b, when viewed from the radial direction. In the embodiment, a plurality of first groove portions 31d are disposed at intervals from each other in the circumferential direction at the core outer-circumferential surface 31c. However, the number of the groove portions is not limited thereto, and only one first groove portion 31d may be arranged at the core outer-circumferential surface 31c.

The teeth 31b extend inward in the radial direction from an inner-circumferential surface of the core back 31a. The plurality of teeth 31b are disposed at intervals from each other in the circumferential direction at the inner circumferential surface of the core back 31a. The teeth 31b face the rotor 2 in the radial direction. An inner surface of the teeth 31b in the radial direction faces the magnet of the rotor 2 via a gap from the outer side in the radial direction.

The insulator 32 is installed at the stator core 31. The insulator 32 is attached to the stator core 31 immovably in at least the circumferential direction and the radial direction. The insulator 32 is fixed to the stator core 31. The material of the insulator 32 includes an insulating material such as a resin. The insulator 32 has a region which covers the plurality of teeth 31b and a tubular portion 34.

The tubular portion 34 is a region which is positioned at an end of the insulator 32 at the one side in the axial direction and a region which is positioned at the outer-most side in the radial direction. The tubular portion 34 extends further than the stator core 31 toward the one side in the axial direction. The tubular portion 34 has a tubular shape centered on the central axis J. The "tubular shape" includes a cylindrical shape and a polygonal-tubular shape. The tubular portion 34 described in the embodiment has a polygonal-tubular shape extending in the axial direction. The tubular portion 34 has a polygonal-tubular shape having four or more corners. That is, an outer circumferential surface of the tubular portion 34 has four or more sides and four or more corners in the cross-sectional view. In the embodiment, the tubular portion 34 has an octagonal-tubular shape. The outer circumferential surface of the tubular portion 34 has eight sides and eight corners in the cross-sectional view.

The outer circumferential surface of the tubular portion 34 has a polygonal shape in the cross-sectional view. The outer circumferential surface of the tubular portion 34 has any one shape of a hexagonal shape, an octagonal shape, a nonagonal shape, a decagonal shape, and a dodecagonal shape, in the cross-sectional view. In the embodiment, the outer circumferential surface of the tubular portion 34 has the octagonal shape in the cross-sectional view. Specifically, the outer circumferential surface of the tubular portion 34 has a regular octagonal shape in the cross-sectional view. In the tubular portion 34, an end surface 34a has a polygonal shape when viewed from the axial direction, the end surface of the tubular portion 34 facing the one side in the axial direction. In the embodiment, the end surface 34a has an octagonal shape, specifically, a regular octagonal shape, when viewed from the axial direction.

The tubular portion 34 has a plurality of insulator flat portion 34b, a second groove portion 34c, and a positioning pin 34d. The plurality of insulator flat portions 34b are lined up at the outer circumferential surface of the tubular portion 34 in the circumferential direction. Each of the insulator flat portions 34b configures a part of the outer circumferential surface of the tubular portion 34 in the circumferential direction. The insulator flat portion 34b faces the outer side in the radial direction. The insulator flat portion 34b has a plane shape expanding in a direction orthogonal to the radial direction. When viewed from the radial direction, the insulator flat portion 34b has a quadrangular shape. When viewed from the radial direction, the insulator flat portion 34b has a rectangular shape in which a length in the axial direction is longer than a length in the circumferential direction.

The number of the insulator flat portions 34b is equal to the number of the coils 33. In other words, the number of the coils 33 and the number of the insulator flat portions 34b are the same as each other. In the embodiment, the motor 1 is an eight-pole/eight-slot motor, that is, the number of the coils 33 is eight. The tubular portion 34 has an octagonal-tubular shape, the outer circumferential surface of the tubular portion 34 has an octagonal shape in the cross-sectional view, and eight insulator flat portions 34b are arranged at the outer circumferential surface of the tubular portion 34 in the circumferential direction. In the embodiment, the number of the corners of the polygonal shape of the outer circumferential surface of the tubular portion 34 is determined depending on the number of the coils 33 (number of slots).

According to the embodiment, the outer circumferential surface of the tubular portion 34 in the cross-sectional view can be set to have a polygonal shape having the same number of sides as the number of the coils 33 (number of slots). Thus, the coils 33 and the insulator flat portions 34b can be disposed to have a one-to-one correspondence relationship. Therefore, a structure of the tubular portion 34 can be simplified, and it is easy to form the tubular portion 34.

The second groove portion 34c is recessed inward in the radial direction from the insulator flat portion 34b and extends in the axial direction. The second groove portion 34c extends over an entire length of the insulator flat portion 34b in the axial direction. An end portion of the second groove portion 34c at the other side in the axial direction is connected to an end portion of the first groove portion 31d at the one side in the axial direction. In other words, the second groove portion 34c is connected to the first groove portion 31d in the axial direction. In the embodiment, the second groove portion 34c is arranged only at one insulator flat portion 34b of the plurality of insulator flat portions 34b. In other words, one second groove portion 34c is arranged at the outer circumferential surface of the tubular portion 34. The second groove portion 34c is disposed at a center portion of the insulator flat portion 34b in the circumferential direction.

The positioning pin 34d projects toward the one side in the axial direction from the end surface 34a of the tubular portion 34, the end surface facing the one side in the axial direction. The positioning pin 34d has a substantially columnar shape extending in the axial direction. A length of the positioning pin 34d in the axial direction is larger than a length of the circuit board 5 in the axial direction, that is, a length (thickness) between a pair of board surfaces of the circuit board 5. A tip of the positioning pin 34d projects further toward the one side in the axial direction than the board surface of the circuit board 5 facing the one side in the axial direction.

The positioning pin 34d is disposed in at least one corner portion of the plurality of corner portions of the end surface 34a. In the embodiment, a plurality of positioning pins 34d are arranged. The plurality of positioning pins 34d are respectively disposed in at least two corner portions of the plurality of corner portions of the end surface 34a. In the embodiment, the end surface 34a has an octagonal shape when viewed from the axial direction and has eight corner portions. The positioning pins 34d are disposed at a half (four) of the total number of (eight) corner portions. One positioning pin 34d is disposed at each of the four corners. Corner portions of the end surface 34a at which the positioning pins 34d are disposed and corner portions of the end surface 34a at which the positioning pins 34d are not disposed are alternately lined up in the circumferential direction.

The coils 33 are installed at the teeth 31b via a region of the insulator 32 which covers the teeth 31b. The plurality of coils 33 are configured by winding a conducting wire around each of the teeth 31b via the insulator 32. In other words, the plurality of coils 33 are installed on the stator core 31 via the insulator 32.

The number of the coils 33 is six or more, specifically, is any number of six, eight, nine, ten, and twelve. In the embodiment, the number of the coils 33 is eight. As described in the embodiment, when the motor 1 is a single-phase motor, and the number of the coils 33 is six (six slots) or more, cogging can be reduced compared with a case in which the motor 1 is a single-phase motor having usual four slots. Here, as described above, the number of the coils 33 is equal to the number of the insulator flat portions 34b. In the embodiment, as the number of the coils 33 increases, that is, as the number of the insulator flat portions 34b increases, the cogging can be further reduced. In addition, when the number of the coils 33 is a multiple of 3 such as six (six slots), nine (nine slots), and twelve (twelve slots), the motor 1 can be easily applied to a three-phase motor.

The circuit board 5 is electrically connected to the stator 3. The circuit board 5 is electrically connected to an external power supply (not illustrated) via the wiring member 9 illustrated in FIG. 1. The circuit board 5 supplies electric power, which is supplied from the external power supply, to the coils 33 of the stator 3. The circuit board 5 controls a current that is supplied to the coils 33.

The circuit board 5 has a plate shape in which the pair of board surfaces face the axial direction. The circuit board 5 has an annular shape centered on the central axis J. The circuit board 5 is disposed at the one side of the tubular portion 34 in the axial direction. The circuit board 5 comes into contact with the end surface 34a of the tubular portion 34 from the one side in the axial direction, the end surface facing the one side in the axial direction.

When the circuit board 5 is viewed from the axial direction, a board outer-circumferential surface of the circuit board 5 has a polygonal shape. When the circuit board 5 is viewed from the axial direction, the board outer-circumferential surface of the circuit board 5 may have a circular shape. The board outer-circumferential surface of the circuit board 5 according to the embodiment has a polygonal shape having four or more corners, when viewed from the axial direction. That is, the board outer-circumferential surface of the circuit board 5 has four or more sides and four or more corners, when viewed from the axial direction. The board outer-circumferential surface has any one shape of a hexagonal shape, an octagonal shape, a nonagonal shape, a decagonal shape, and a dodecagonal shape, when viewed from the axial direction. In the embodiment, the board outer-circumferential surface has an octagonal shape when viewed from the axial direction. The board outer-circumferential surface has eight sides and eight corners when viewed from the axial direction. Specifically, in the embodiment, the board outer-circumferential surface has a regular octagonal shape when viewed from the axial direction.

When viewed from the axial direction, the board outer-circumferential surface of the circuit board 5 and the outer circumferential surface of the tubular portion 34 overlap each other over a substantially entire circumference around the central axis J. When viewed from the axial direction, the shape of the board outer-circumferential surface of the circuit board 5 is substantially identical with the shape of the outer circumferential surface of the tubular portion 34. When viewed from the axial direction, a plurality of (eight) side portions of the board outer-circumferential surface overlap the plurality of (eight) insulator flat portions 34b of the tubular portion 34. Although not illustrated in particular, when viewed from the axial direction, a diameter of a circumscribed circle of the board outer-circumferential surface of the circuit board 5 is larger than an outer diameter of the stator core 31. That is, when viewed from the axial direction, the diameter of the circumscribed circle passing through the plurality of corners of the board outer-circumferential surface and centered on the central axis J is larger than the outer diameter of the core outer-circumferential surface 31c. In addition, when viewed from the axial direction, an inscribed circle of the board outer-circumferential surface of the circuit board 5 overlaps the core outer-circumferential surface 31c. That is, when viewed from the axial direction, the inscribed circle in contact with the plurality of sides of the board outer-circumferential surface and centered on the central axis J substantially matches the core outer-circumferential surface 31c. According to the embodiment, a large area of the board surface of the circuit board 5 can be secured. Consequently, a degree of freedom of the wiring pattern of the circuit board 5 increases, an increase in heat in the circuit board 5 is reduced, and noise is inhibited.

The circuit board 5 has a shaft hole 5a, a plurality of board corner portions 5b and 5c, and a board recessed portion 5d. The shaft hole 5a is disposed at a central portion of the circuit board 5 when viewed from the axial direction. The shaft hole 5a penetrates the circuit board 5 in the axial direction. In the embodiment, the shaft hole 5a has a circular hole shape. The shaft 21 is inserted into the shaft hole 5a in the axial direction.

The plurality of board corner portions 5b and 5c are lined up in the circumferential direction at an outer circumferential portion of the circuit board 5. The plurality of board corner portions 5b and 5c includes a first board corner portion 5b and a second board corner portion 5c. The first board corner portion 5b faces, in the axial direction, the corner portion at which the positioning pin 34d is disposed, among the plurality of corner portions of the end surface 34a of the tubular portion 34, the end surface 34a facing the one side in the axial direction.

The first board corner portion 5b has a pin inserting portion 5e. The positioning pin 34d is inserted into the pin inserting portion 5e. The pin inserting portion 5e is any one of a groove which is recessed inward in the radial direction from the board outer-circumferential surface of the circuit board 5 and extends in the axial direction and a hole which penetrates the circuit board 5 in the axial direction, and the pin inserting portion in the embodiment is a groove. A plurality of first board corner portions 5b is arranged, and a plurality of pin inserting portions 5e are also arranged. In the embodiment, four first board corner portions 5b are arranged at equal pitches in the circumferential direction, and four pin inserting portions 5e are also arranged at equal pitches in the circumferential direction.

According to the embodiment, the positioning pin 34d is inserted into the pin inserting portion 5e, and thereby position alignment of the insulator 32 and the circuit board 5 can be easily performed in the radial direction and the circumferential direction. In addition, a plurality of sets of the positioning pins 34d and the pin inserting portions 5e into which the positioning pin 34d is inserted are arranged, and thereby relative movement of the insulator 32 and the circuit board 5 in all of the directions along a virtual plane perpendicular to the central axis J can be inhibited.

The second board corner 5c faces, in the axial direction, the corner portion at which the positioning pin 34d is not disposed, among the plurality of corner portions of the end surface 34a of the tubular portion 34, the end surface 34a facing the one side in the axial direction. A plurality of second board corner portions 5c are arranged. In the embodiment, four second board corner portions 5c are arranged at equal pitches in the circumferential direction. The first board corner portions 5b and the second board corner portions 5c are alternately lined up in the circumferential direction at the outer circumferential portion of the circuit board 5. According to the embodiment, the position alignment of the circuit board 5 with respect to the insulator 32 can be more stably performed. In addition, the circuit board 5 can be more stably fixed to the tubular portion 34.

The board recessed portion 5d is recessed inward in the radial direction from the board outer-circumferential surface of the circuit board 5. The board recessed portion 5d extends in the axial direction at the board outer-circumferential surface of the circuit board 5. The board recessed portion 5d has a groove shape extending over an entire length (whole thickness) of the board outer-circumferential surface in the axial direction. Only one board recessed portion 5d is arranged at the board outer-circumferential surface. The board recessed portion 5d is disposed at one side portion of the eight side portions of the board outer-circumferential surface. The board recessed portion 5d is disposed at a central portion of the side portion of the board outer-circumferential surface in the circumferential direction.

Figure 2:
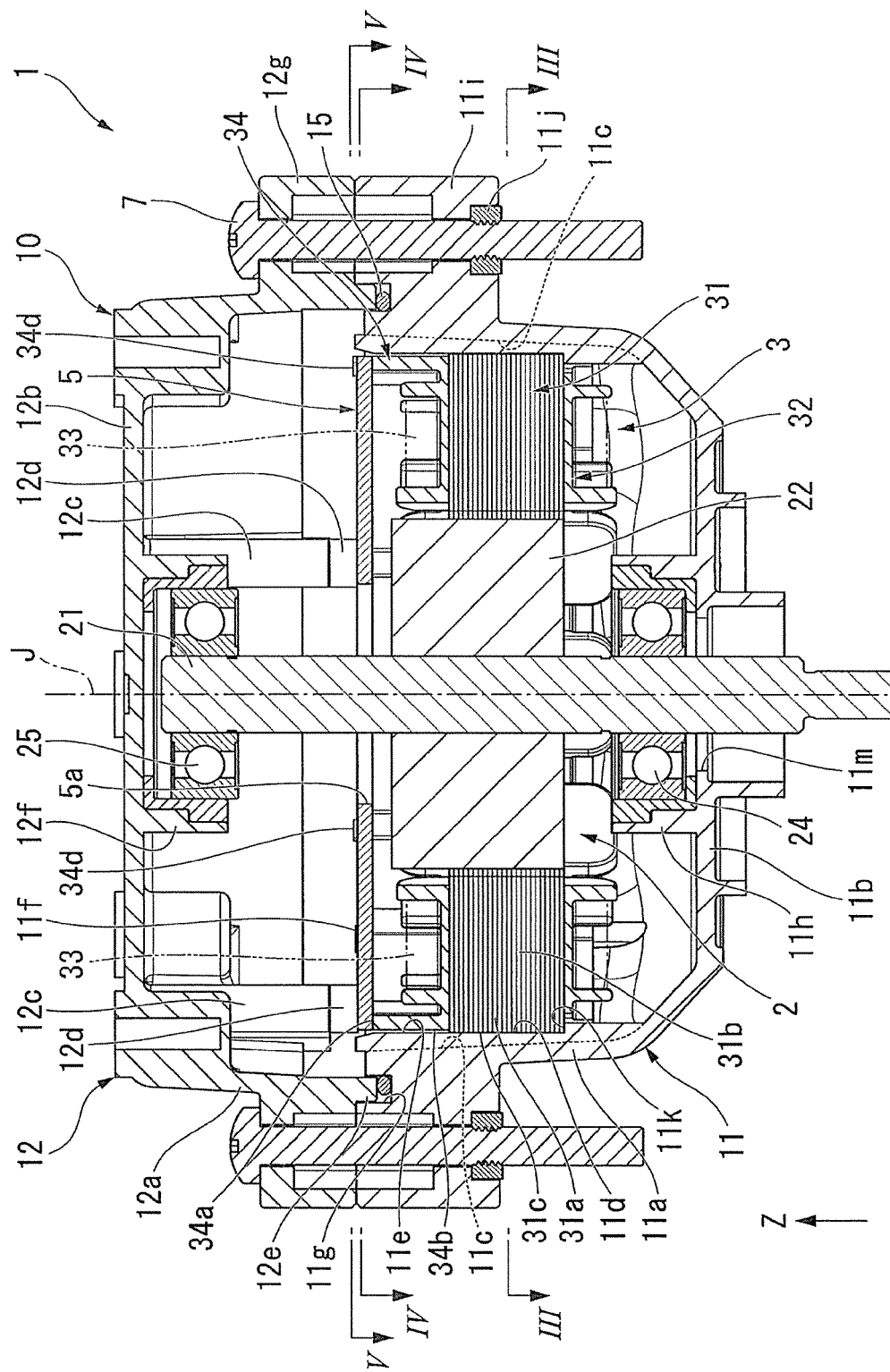
FIG. 2 is a longitudinal sectional view illustrating the motor of the embodiment.

As illustrated in FIGS. 1 and 2, the motor case 10 accommodates the rotor 2, the stator 3, and the circuit board 5. Further, the motor case 10 accommodates the plurality of bearings 24 and 25 and a part of the wiring member 9. The motor case 10 includes a first case portion 11, a second case portion 12, and a wiring holding member 16. At least the first case portion 11 of members which configure the motor case 10 is made of resin. In the embodiment, the second case portion 12 is also made of resin.

At least the rotor 2 and the stator 3 are disposed in the first case portion 11. Further, the circuit board 5, the bearing 24, and a part of the wiring holding member 16 are disposed in the first case portion 11. The first case portion 11 has a bottomed tubular shape. The first case portion 11 has a circumferential wall 11a and a bottom wall 11b. Moreover, the circumferential wall 11a may be called as a first circumferential wall 11a. Further, the first case portion 11 has a plurality of case flat portions 11c, a core butting portion 11k, a core support 11d, a first detent 11e, a second detent 11f, an annular groove portion 11g, a first ear portion 11i, a nut 11j, a first holder supporting tube 11h, and a shaft passing hole 11m.

The circumferential wall 11a has a tubular shape extending in the axial direction. In the embodiment, the circumferential wall 11a has a tapered tubular shape in which a diameter increases toward the one side in the axial direction. The circumferential wall 11a has a conical-tubular region and a polygonal-tubular region. The conical-tubular region is positioned at an end portion of the circumferential wall 11a at the other side in the axial direction. The conical-tubular region is connected to the bottom wall 11b. The polygonal-tubular region is positioned in a region of the circumferential wall 11a other than the end portion at the other side in the axial direction. The polygonal-tubular region of the circumferential wall 11a has a polygonal-tubular shape having four or more corners. In the embodiment, the polygonal-tubular region has an octagonal-tubular shape.

An outer circumferential surface of the circumferential wall 11a of the first case portion 11 has a polygonal shape in the cross-sectional view. Specifically, in the cross-sectional view, an outer circumferential surface of the polygonal-tubular region of the circumferential wall 11a has a polygonal shape and has an octagonal shape in the embodiment. According to the embodiment, design quality of the external appearance of the first case portion 11 can be improved.

An inner circumferential surface of the circumferential wall 11a of the first case portion 11 has a polygonal shape in the cross-sectional view. Specifically, in the cross-sectional view, an inner circumferential surface of the polygonal-tubular region of the circumferential wall 11a has a polygonal shape and has an octagonal shape in the embodiment. The outer circumferential surface and the inner circumferential surface of the circumferential wall 11a have a shape similar to each other in the cross-sectional view. According to the embodiment, the circumferential wall 11a of the first case portion 11 can have a constant thickness in the circumferential direction, and stiffness of the circumferential wall 11a can be secured over the entire region in the circumferential direction.

The plurality of case flat portions 11c are lined up at the inner circumferential surface of the circumferential wall 11a in the circumferential direction. Each of the case flat portions 11c configures a part of the inner circumferential surface of the circumferential wall 11a in the circumferential direction. The case flat portions 11c is disposed at an inner circumferential surface of the polygonal-tubular region of the circumferential wall 11a. The case flat portions 11c faces the inner side in the radial direction. The case flat portions 11c has a plane shape expanding in a direction intersecting (direction substantially orthogonal to) with the radial direction. The case flat portions 11c extends in a direction orthogonal to the radial direction in the cross-sectional view.

In the embodiment, the polygonal-tubular region of the circumferential wall 11a has an octagonal shape, and the number of the case flat portions 11c is eight. That is, the number of the case flat portions 11c and the number of the insulator flat portions 34b are the same as each other. In addition, the number of the case flat portions 11c and the number of the coils 33 are the same as each other. The case flat portions 11c face the stator core 31 and the tubular portion 34 in the radial direction. Specifically, the case flat portions 11c and the core outer-circumferential surface 31c face each other via a gap in the radial direction. The case flat portions 11c and the insulator flat portions 34b face each other via a gap in the radial direction. The case flat portions 11c and the insulator flat portions 34b are disposed in parallel with each other when viewed from the axial direction.

The core butting portion 11k projects inward in the radial direction from the inner circumferential surface of the circumferential wall 11a and comes into contact with the stator core 31 from the other side in the axial direction. The core butting portion 11k has a rib shape extending in the axial direction. In the core butting portion 11k, an end surface of the core butting portion 11k which faces the one side in the axial direction comes into contact with a surface of the core back 31a which faces the other side in the axial direction. Three or more core butting portions 11k are arranged at the inner circumferential surface of the circumferential wall 11a at intervals from each other in the circumferential direction. In the embodiment, four core butting portions 11k are arranged at equal intervals from each other in the circumferential direction. The core butting portions 11k are disposed at the case flat portions 11c. The core butting portions 11k are positioned at a central portion of the case flat portion 11c in the circumferential direction. According to the embodiment, three or more core butting portions 11k come into contact with the core back 31a of the stator core 31 in the axial direction, and thereby a position of the stator 3 in the axial direction with respect to the first case portion 11 is stably set.

Figure 3:
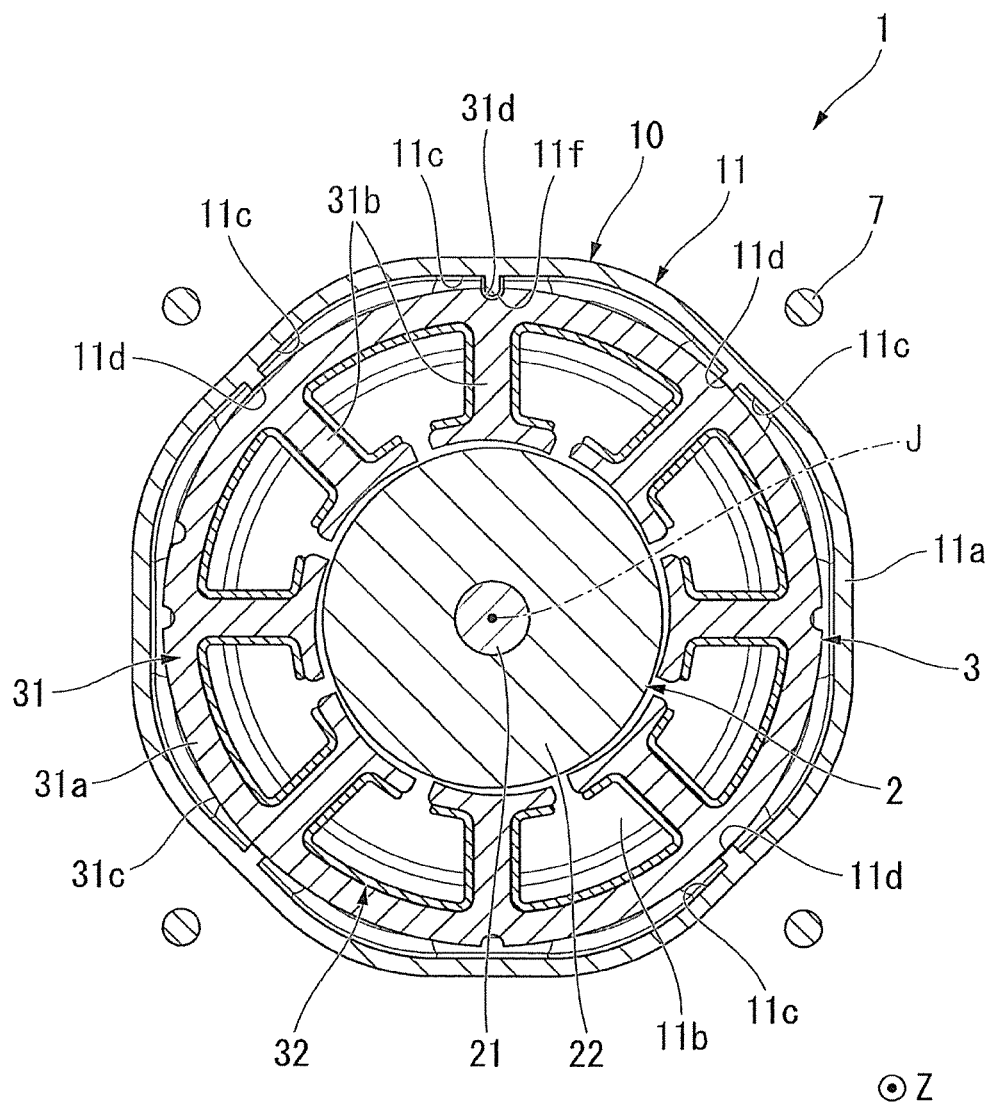
FIG. 3 is a cross-sectional view of a cross-section along a line III-III in FIG. 2, in which illustration of a coil is omitted.
Figure 4:
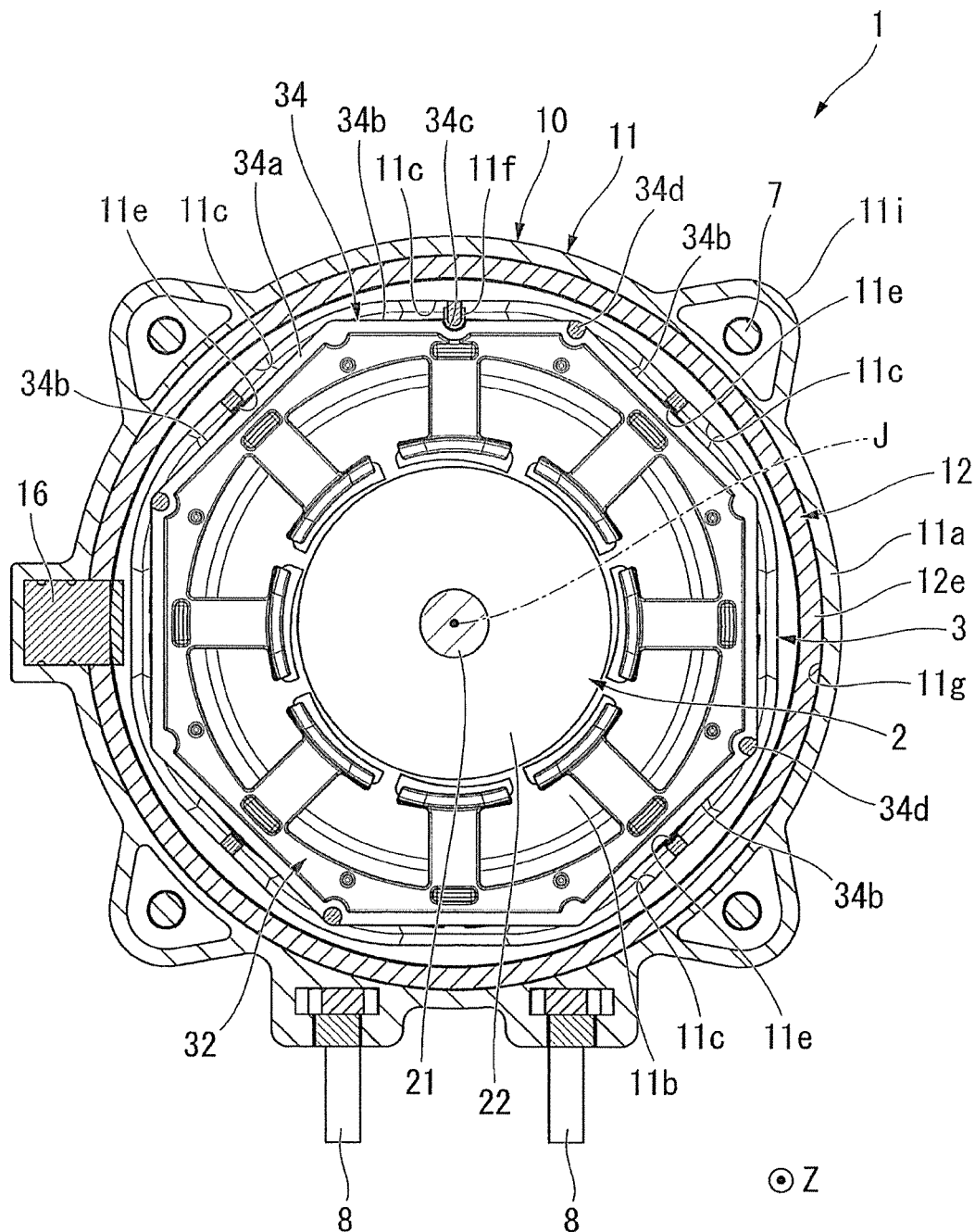
FIG. 4 is a cross-sectional view of a cross-section along a line IV-IV in FIG. 2, in which illustration of a circuit board and the coil is omitted.
Figure 5:
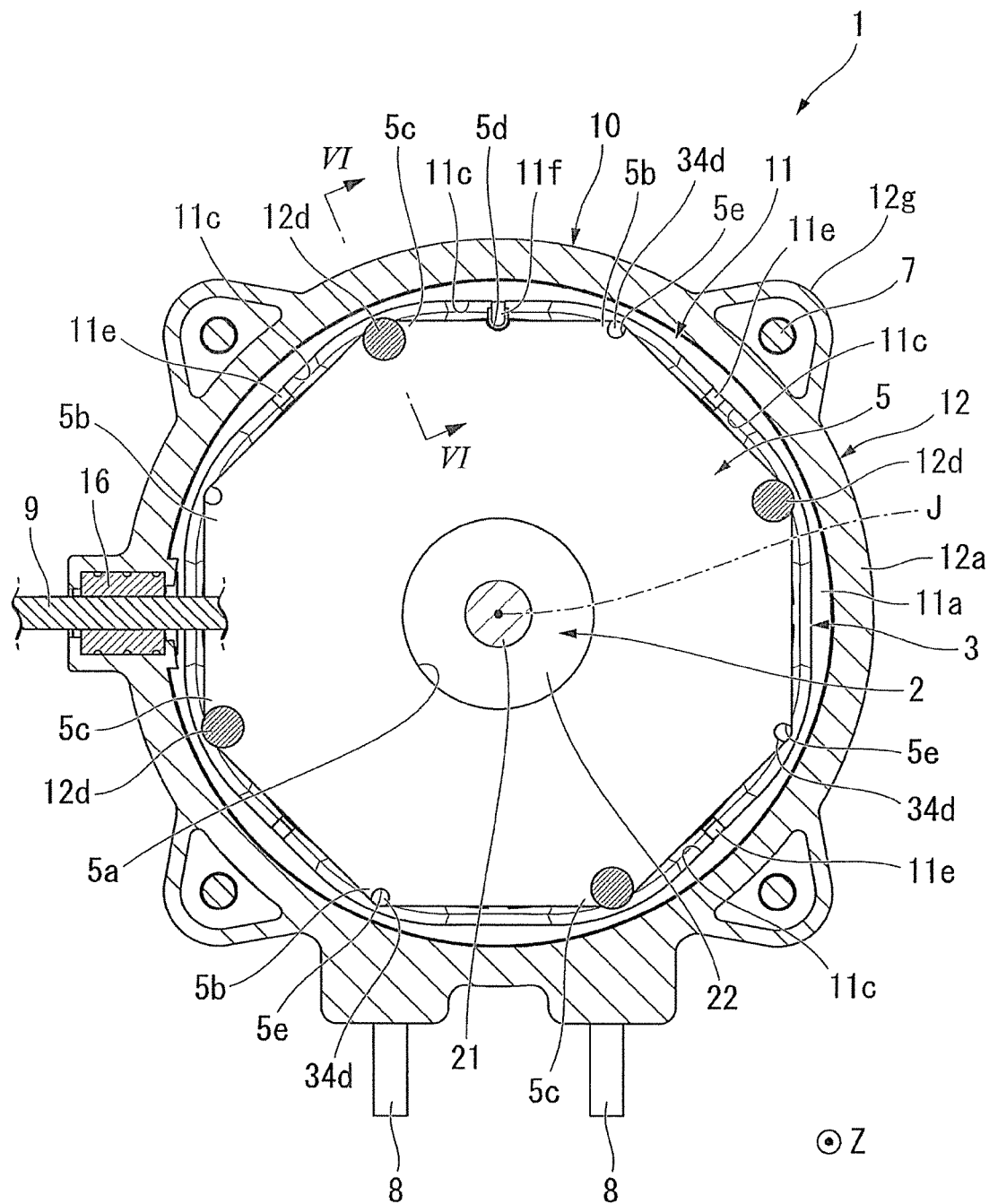
FIG. 5 is a cross-sectional view of a cross-section along a line V-V in FIG. 2.
Figure 6:
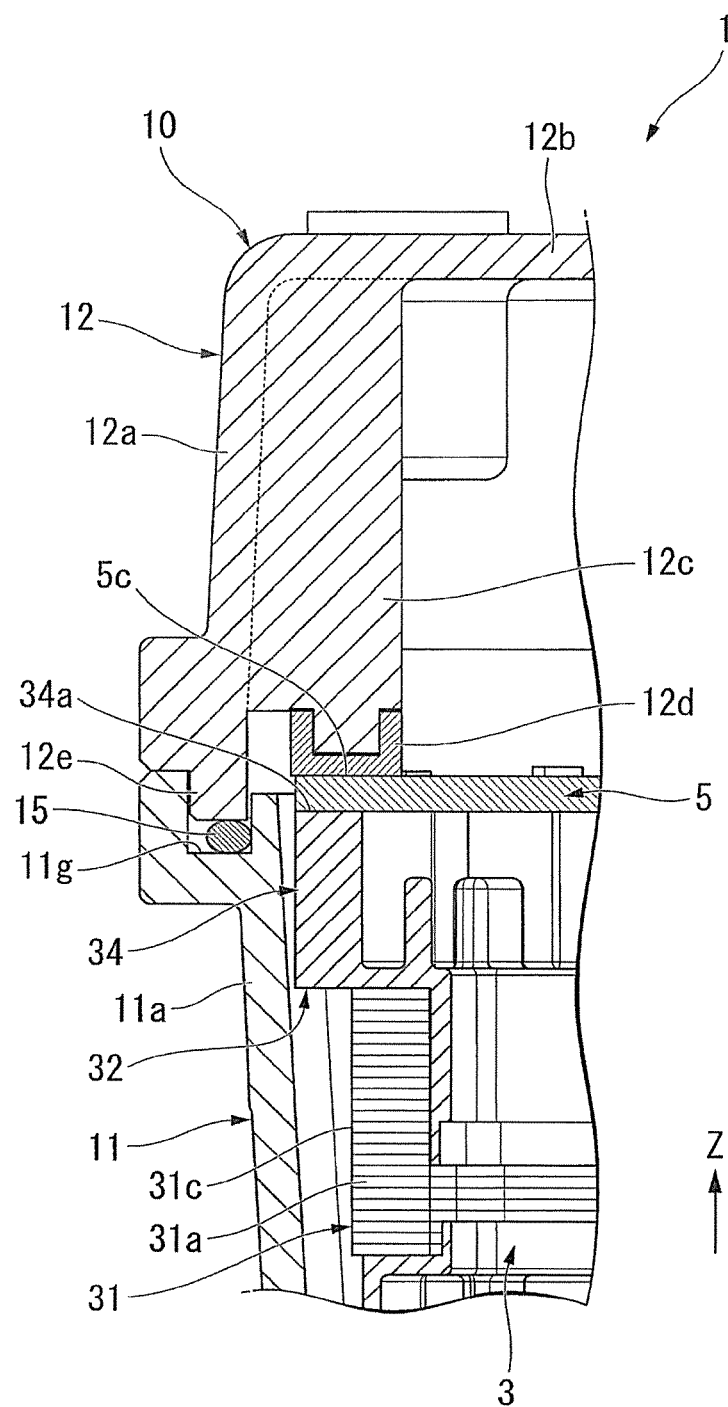
FIG. 6 is a longitudinal sectional view of a cross-section along a line VI-VI in FIG. 5, in which illustration of the coil is omitted.

As illustrated in FIG. 3, the core support 11d projects inward in the radial direction from the inner circumferential surface of the circumferential wall 11a and comes into contact with the core outer-circumferential surface 31c. That is, an inner surface of the core support 11d in the radial direction comes into contact with the core outer-circumferential surface 31c. The core support 11d has a rib shape extending in the axial direction. A height of the core support 11d which projects inward in the radial direction from the inner circumferential surface of the circumferential wall 11a is smaller than a height of the core butting portion 11k which projects inward in the radial direction from the inner circumferential surface of the circumferential wall 11a. The height of the core support 11d which projects inward in the radial direction from the inner circumferential surface of the circumferential wall 11a increases toward the one side in the axial direction. Consequently, the core support 11d comes into contact with the core outer-circumferential surface 31c over the entire length of the core outer-circumferential surface 31c in the axial direction.

Three or more core supports 11d are arranged at the inner circumferential surface of the circumferential wall 11a at intervals from each other in the circumferential direction. In the embodiment, four core supports 11d are arranged at equal intervals from each other in the circumferential direction. The number of the core supports 11d and the number of the core butting portions 11k are the same as each other. The core supports 11d are disposed at the case flat portions 11c. The core supports 11d are positioned at a central portion of the case flat portion 11c in the circumferential direction. A position of the core support 11d in the circumferential direction and a position of the core butting portion 11k in the circumferential direction are the same as each other. The core support 11d and the core butting portion 11k are connected to each other in the axial direction.

The first detent 11e projects inward in the radial direction from the inner circumferential surface of the circumferential wall 11a and is in contact with or is disposed to come into contact with the insulator flat portion 34b. That is, an inner surface of the first detent 11e in the radial direction is in contact with the insulator flat portion 34b or faces the insulator flat portion 34b so as to come into contact with the insulator flat portion 34b. In addition, the first detent 11e faces the board outer-circumferential surface of the circuit board 5 in the radial direction. The first detent 11e faces a flat portion of the board outer-circumferential surface, that is, a side portion of the board outer-circumferential surface when viewed from the axial direction, via a gap in the radial direction. The first detent 11e has a rib shape extending in the axial direction. A radial position of an inner surface of the first detent 11e in the radial direction and a radial-direction position of the inner surface of the core support 11d in the radial direction are the same as each other. In other words, the inner surface of the first detent 11e in the radial direction and the inner surface of the core support 11d in the radial direction are coplanar with respect to the position in the radial direction.

A height of the first detent 11e which projects inward in the radial direction from the inner circumferential surface of the circumferential wall 11a is slightly larger than a height of the core support 11d which projects inward in the radial direction from the inner circumferential surface of the circumferential wall 11a. The height of the first detent 11e which projects inward in the radial direction from the inner circumferential surface of the circumferential wall 11a increases toward the one side in the axial direction. Consequently, the first detent 11e is in contact with or is disposed to come into contact with the insulator flat portion 34b over the entire length of the insulator flat portion 34b in the axial direction. At least one first detent 11e is disposed at the inner circumferential surface of the circumferential wall 11a.

According to the embodiment, three or more core supports 11*d* of the first case portion 11 come into contact with the core outer-circumferential surface 31*c* of the stator core 31, and thereby positions of the first case portion 11 and the stator 3 are coaxially aligned. That is, the three or more core supports 11*d* support the core outer-circumferential surface 31*c* at respective parts, that is, "points", in the circumferential direction. Consequently, relative positions of the first case portion 11 made of resin and the stator 3 in the radial direction are stably set, and relative positional accuracy of the first case portion and the stator in the radial direction is secured. In addition, the first detent 11*e* comes into contact with the insulator flat portion 34*b*, and thereby the first case portion 11 and the stator 3 are inhibited from being relatively rotated around the central axis J. Hence, while manufacturing costs of the motor 1 is reduced by using the first case portion 11 made of resin, the position alignment of the motor case 10 and the stator 3 is stably performed, and the motor case 10 and the stator 3 are inhibited from idling.

Preferably, three or more first detents 11*e* are arranged at the inner circumferential surface of the circumferential wall 11*a* at intervals from each other in the circumferential direction. In the embodiment, four first detents 11*e* are arranged at equal intervals from each other in the circumferential direction. The number of the first detents 11*e* and the number of the core supports 11*d* are the same as each other. The first detents 11*e* are disposed at the case flat portions 11*c*. The first detent 11*e* is positioned at a central portion of the case flat portion 11*c* in the circumferential direction. A position of the first detent 11*e* in the circumferential direction and a position of the core support 11*d* in the circumferential direction are the same as each other. The first detent 11*e* and the core support 11*d* are connected to each other in the axial direction.

In the embodiment, the core support 11*d* and the first detent 11*e* are connected to each other in the axial direction, and thereby the set of the core support 11*d* and the first detent 11*e* forms one rib extending in the axial direction. For example, a structure of the first case portion 11 can be simplified according to the disclosure, compared with a case in which the core support 11*d* and the first detent 11*e* are separately arranged in the first case portion 11. Further, in the embodiment, the core butting portion 11*k* is connected to the core support 11*d* in the axial direction, and thus a remarkable effect is achieved in that the structure of the first case portion 11 can be simplified.

In addition, because the first detent 11*e* is disposed at the case flat portion 11*c*, the first detent 11*e* is more stably brought into contact with the insulator flat portion 34*b*. Specifically, in the embodiment, the first detent 11*e* faces a region of the insulator flat portion 34*b* in the radial direction in the cross-sectional view, the region being positioned at an innermost side in the radial direction. That is, the first detent 11*e* faces, in the radial direction, the central portion of the insulator flat portion 34*b* in the circumferential direction in the cross-section view. According to the embodiment, an allowable amount of relative rotation of the first case portion 11 and the stator 3 is further reduced, and the motor case 10 and the stator 3 can be further inhibited from idling.

The second detent 11*f* projects inward in the radial direction from the inner circumferential surface of the circumferential wall 11*a* and extends in the axial direction. The second detent 11*f* has a rib shape extending in the axial direction. The second detent 11*f* is disposed at the polygonal-tubular region of the circumferential wall 11*a* and extends over the entire length of the polygonal-tubular region in the axial direction. One second detent 11*f* is disposed at the inner circumferential surface of the circumferential wall 11*a*. The second detent 11*f* is disposed at the case flat portion 11*c*. The second detent 11*f* is disposed at a central portion of the case flat portion 11*c* in the circumferential direction. The second detent 11*f* is disposed over the entire length of the case flat portion 11*c* in the axial direction.

The second detent 11*f* faces the stator core 31, the tubular portion 34, and the circuit board 5 in the radial direction. The second detent 11*f* faces the core outer-circumferential surface 31*c* in the radial direction. The second detent 11*f* faces the insulator flat portion 34*b* in the radial direction. The second detent 11*f* faces, in the radial direction, the flat portion of the board outer-circumferential surface of the circuit board 5, that is, the side portion of the board outer-circumferential surface when viewed from the axial direction.

The second detent 11*f* is inserted into the first groove portion 31*d*. According to the embodiment, by inserting the second detent 11*f* into the first groove portion 31*d*, the first case portion 11 and the stator core 31 are further inhibited from being relatively rotated around the central axis J. Hence, the first case portion 11 and the stator 3 are further inhibited from idling.

The second detent 11*f* is inserted into the second groove portion 34*c*. According to the embodiment, by inserting the second detent 11*f* into the second groove portion 34*c*, the first case portion 11 and the tubular portion 34 are further inhibited from being relatively rotated around the central axis J. Hence, the first case portion 11 and the stator 3 are further inhibited from idling.

The second detent 11*f* is inserted into the board recessed portion 5*d*. According to the embodiment, by inserting the second detent 11*f* into the board recessed portion 5*d*, position alignment of the first case portion 11 and the stator 3 with the circuit board 5 in the circumferential direction can be easily performed.

The annular groove portion 11*g* is recessed toward the other side in the axial direction from the end surface of the circumferential wall 11*a* and extends in the circumferential direction, the end surface facing the one side in the axial direction. The annular groove portion 11*g* has an annular shape centered on the central axis J.

The first ear portion 11*i* projects outward in the radial direction from the end portion of the circumferential wall 11*a* at the one side in the axial direction. A plurality of first ear portions 11*i* is arranged at intervals from each other in the circumferential direction. The first ear portion 11*i* has a screw inserting hole which penetrates the first ear portion 11*i* in the axial direction. The nut 11*j* is embedded in the screw inserting hole of the first ear portion 11*i*.

The bottom wall 11*b* has a plate shape in which a pair of board surfaces face the axial direction. The outer circumferential portion of the bottom wall 11*b* is connected to the end portion of the circumferential wall 11*a* at the other side in the axial direction, that is, the conical-tubular region. The first holder supporting tube 11*h* has a tubular shape extending from the bottom wall 11*b* toward the one side in the axial direction.

The shaft passing hole 11*m* penetrates the bottom wall 11*b* in the axial direction. The shaft 21 passes through the shaft passing hole 11*m*. An end portion of the shaft 21 at the other side in the axial direction is exposed outside the motor 1 through the shaft passing hole 11*m*. In other words, the shaft 21 has a region positioned closer to the other side in the axial direction than the shaft passing hole 11*m*. A fan not illustrated is fixed to the end portion of the shaft 21 at the other side in the axial direction.

A position of the second case portion 12 in the axial direction is different from a position of the first case portion 11 in the axial direction. Hence, in the embodiment, of the axial direction, a direction directed from the first case portion 11 toward the second case portion 12 may be referred to as the one side (+Z side) in the axial direction, and a direction directed from the second case portion 12 toward the first case portion 11 may be referred to as the other side (−Z side) in the axial direction. The second case portion 12 faces the first case portion 11 from the one side in the axial direction and is coupled to the first case portion 11.

The bearing 25, a part of the wiring member 9, and a part of the wiring holding member 16 are disposed in the second case portion 12. The second case portion 12 has a topped tubular shape. The second case portion 12 has a circumferential wall 12*a* and a top wall 12*b*. Moreover, the circumferential wall 12*a* may be called as a second circumferential wall 12*a*. Further, the second case portion 12 has a pressing rib 12*c*, a board pressing portion 12*d*, an annular rib 12*e*, a second ear portion 12*g*, and a second holder supporting tube 12*f*.

The circumferential wall 12*a* has a tubular shape extending in the axial direction. In the embodiment, the circumferential wall 12*a* has a substantially cylindrical shape. A diameter of the circumferential wall 12*a* slightly increases toward the other side in the axial direction. The pressing rib 12*c* projects inward in the radial direction from an inner circumferential surface of the circumferential wall 12*a* and extends in the axial direction. An end portion of the pressing rib 12*c* at the one side in the axial direction is connected to the top wall 12*b*. An end portion of the pressing rib 12*c* at the other side in the axial direction is positioned closer to the one side in the axial direction than the circuit board 5. The end portion of the pressing rib 12*c* at the other side in the axial direction faces the second board corner portion 5*c* of the circuit board 5 in the axial direction. A plurality of pressing ribs 12*c* are disposed at the inner circumferential surface of the circumferential wall 12*a* at intervals from each other in the circumferential direction. In the embodiment, four pressing ribs 12*c* are arranged at equal intervals from each other in the circumferential direction. The pressing rib 12*c* holds the board pressing portion 12*d* at the end portion of the pressing rib 12*c* at the other side in the axial direction.

The board pressing portion 12*d* is supported by the pressing rib 12*c*. The board pressing portion 12*d* is fixed to the end portion of the pressing rib 12*c* at the other side in the axial direction. In the embodiment, the board pressing portion 12*d* has a bottomed tubular shape. In the board pressing portion 12*d*, an end surface of the board pressing portion 12*d* has a plane shape perpendicular to the central axis J, the end surface facing the other side in the axial direction. The board pressing portion 12*d* comes into contact with the circuit board 5 from the one side in the axial direction. The board pressing portion 12*d* is disposed to overlap the second board corner portion 5*c* when viewed from the axial direction. The end surface of the board pressing portion 12*d* comes into contact with the second board corner portion 5*c* in the axial direction, the end surface facing the other side in the axial direction.

According to the embodiment, the end surface 34*a* of the tubular portion 34 and the board pressing portion 12*d* can press and fix the circuit board 5 from both sides in the axial direction. Since the circuit board 5 can be fixed without using a screw or the like, manufacturing man-hours of the motor 1 can be reduced, and it is easy to perform manufacturing. In addition, the board pressing portion 12*d* presses the second board corner portion 5*c* positioned at the outer circumferential portion of the circuit board 5, and thus a degree of freedom of the wiring pattern of the circuit board 5 is well maintained. In addition, since the board pressing portion 12*d* presses the second board corner portion 5*c*, interference with the positioning pin 34*d* which is considered when the board pressing portion 12*d* presses the first board corner portion 5*b* is inhibited and the circuit board 5 is stably fixed.

A plurality of board pressing portions 12*d* is arranged. In the embodiment, four board pressing portions 12*d* are arranged at equal pitches in the circumferential direction. The number of the board pressing portions 12*d* and the number of the second board corner portions 5*c* are the same as each other. The board pressing portions 12*d* press the second board corner portions 5*c* from the axial direction. According to the embodiment, the circuit board 5 can be more stably fixed by the plurality of board pressing portions 12*d*.

The board pressing portion 12*d* is made of rubber or resin, and in the embodiment, the board pressing portion 12*d* is made of rubber. According to the embodiment, even when the board pressing portion 12*d* comes into contact with the circuit board 5, the circuit board 5 is unlikely to be damaged. In addition, the board pressing portion 12*d* is made of a non-metal material, and thus noise of the circuit board 5 can be suppressed compared with a case in which the circuit board 5 is fixed with a metal screw or the like, for example.

The annular rib 12*e* projects toward the other side in the axial direction from an end surface of the circumferential wall 12*a* and extends in the circumferential direction, the end surface facing the other side in the axial direction. The annular rib 12*e* has an annular shape centered on the central axis J. The annular rib 12*e* is inserted into the annular groove portion 11*g*.

The second ear portion 12*g* projects outward in the radial direction from the end portion of the circumferential wall 12*a* at the other side in the axial direction. A plurality of second ear portions 12*g* is arranged at intervals from each other in the circumferential direction. The second ear portion 12*g* has a screw inserting hole which penetrates the second ear portion 12*g* in the axial direction. When viewed from the axial direction, the second ear portions 12*g* and the first ear portions 11*i* are disposed to overlap each other. The second ear portions 12*g* and the first ear portions 11*i* are in connect with each other in the axial direction. The fastening screws 7 are screwed into the nuts 11*j* through the screw inserting holes of the second ear portions 12*g* and the screw inserting holes of the first ear portions 11*i*, and thereby the first case portion 11 and the second case portion 12 are fixed to each other.

The top wall 12*b* has a plate shape in which a pair of board surfaces face the axial direction. An outer circumferential portion of the top wall 12*b* is connected to the end portion of the circumferential wall 12*a* at the one end in the axial direction. The second holder supporting tube 12*f* has a tubular shape extending from the top wall 12*b* toward the other side in the axial direction.

The wiring holding member 16 has a tubular shape extending in the radial direction. The interior of the wiring holding member 16 is led to the interior and the exterior of the motor case 10. The wiring holding member 16 holds a part of the wiring member 9 at an inner circumferential surface of the wiring holding member 16. The wiring holding member 16 is disposed between the circumferential wall 11a of the first case portion 11 and the circumferential wall 12a of the second case portion 12 in the axial direction so as to be held by the circumferential wall 11a and the circumferential wall 12a.

Although not illustrated in particular, the wiring member 9 is electrically connected to an external power supply. The wiring member 9 is electrically connected to the circuit board 5. The wiring member 9 supplies electric power, which is supplied from the external power supply, to the circuit board 5. Although not illustrated, the wiring member 9 has a wiring for power supply, a wiring for signal, and a wiring for ground.

In addition, the configurations (structural elements) described in the embodiment, the variation example, the note, and the like described above may be combined, and addition, omission, replacement, and modification of the configurations can be performed, within a scope not departing from the gist of the disclosure. In addition, the disclosure is not limited to the embodiment described above and is only limited by the claims.

What is claimed is:

1. A motor comprising:
   a rotor centred on a central axis;
   a stator facing the rotor in a radial direction;
   a circuit board electrically connected to the stator; and
   a motor case that accommodates the rotor, the stator, and the circuit board,
   wherein the motor case comprises
   a first case portion having a bottomed tubular shape which is made of resin and in which at least the rotor and the stator are disposed, and
   a second case portion having a topped tubular shape which faces the first case portion from one side in an axial direction and is coupled to the first case portion,
   wherein the stator comprises
   a stator core which surrounds the rotor from an outer side in the radial direction and in which a core outer-circumferential surface has a circular shape in a cross-sectional view perpendicular to the central axis, and
   an insulator which is fixed to the stator core,
   wherein the insulator comprises a tubular portion which extends further than the stator core toward one side in the axial direction and is centred on the central axis,
   wherein an outer circumferential surface of the tubular portion has a polygonal shape in the cross-sectional view,
   wherein the tubular portion comprises, on the outer circumferential surface, a plurality of insulator flat portions lined up in a circumferential direction, and
   wherein the first case portion comprises
   three or more core supports which project inward in the radial direction from an inner circumferential surface of a circumferential wall of the first case portion, come into contact with the core outer-circumferential surface, and are disposed at intervals from each other in the circumferential direction, and
   at least one first detent which projects inward in the radial direction from the inner circumferential surface of the circumferential wall and which is in contact with one of the plurality of insulator flat portions.

2. The motor according to claim 1,
   wherein the three or more core supports and the at least one first detent are connected to each other in the axial direction.

3. The motor according to claim 2,
   wherein the at least one first detent is disposed three or more at intervals from each other in the circumferential direction, and
   wherein a number of the three or more core supports and a number of the at least one first detent are the same as each other.

4. The motor according to claim 1,
   wherein the at least one first detent faces a portion of the plurality of insulator flat portions in the radial direction in the cross-sectional view, the portion being positioned at an innermost side in the radial direction.

5. The motor according to claim 1,
   wherein the stator comprises a plurality of coils mounted on the stator core via the insulator, and
   wherein the number of the coils and the number of the plurality of insulator flat portions are the same as each other.

6. The motor according to claim 5,
   wherein the outer circumferential surface of the tubular portion has any one shape of a hexagonal shape, an octagonal shape, a nonagonal shape, a decagonal shape, and a dodecagonal shape, in the cross-sectional view.

7. The motor according to claim 1,
   wherein the first case portion comprises a second detent which projects inward in the radial direction from the inner circumferential surface of the circumferential wall of the first case portion and extends in the axial direction, and
   wherein the stator core has a first groove portion which is recessed inward in the radial direction from the core outer-circumferential surface and extends in the axial direction and into which the second detent is inserted.

8. The motor according to claim 7,
   wherein the tubular portion comprises a second groove portion which is recessed inward in the radial direction from the plurality of insulator flat portions and extends in the axial direction and into which the second detent is inserted.

9. The motor according to claim 7,
   wherein the circuit board comprises a pair of board surfaces facing the axial direction and is disposed at one side of the tubular portion in the axial direction, and
   wherein the circuit board comprises a board recessed portion which is recessed inward in the radial direction from a board outer-circumferential surface of the circuit board and into which the second detent is inserted.

10. The motor according to claim 1,
    wherein the tubular portion comprises an end surface facing one side in the axial direction and having a polygonal shape when viewed from the axial direction,
    wherein the tubular portion comprises a positioning pin which is disposed in at least one corner portion of a plurality of corner portions of the end surface and projects from the end surface toward one side in the axial direction,
    wherein the circuit board comprises a pair of board surfaces facing the axial direction and is in contact with the end surface from one side in the axial direction,
    wherein a board outer-circumferential surface of the circuit board has a polygonal shape when the circuit board is viewed from the axial direction,
    wherein the circuit board comprises a plurality of board corner portions lined up in the circumferential direction at an outer circumferential portion of the circuit board,
    wherein the plurality of board corner portions comprises a first board corner portion which faces, in the axial direction, the corner portion at which the positioning pin is disposed among the plurality of corner portions of the end surface, and a second board corner portion which faces, in the axial direction, the corner portion at which the positioning pin is not disposed among the plurality of corner portions of the end surface, and wherein the first board corner portion comprises a pin inserting portion into which the positioning pin is inserted.

11. The motor according to claim 10,
wherein the pin inserting portion is any one of a groove which is recessed inward in the radial direction from the board outer-circumferential surface and extends in the axial direction and a hole which penetrates the circuit board in the axial direction.

12. The motor according to claim 10, further comprising:
a plurality of the positioning pins; and
a plurality of the first board corner portions;
wherein the plurality of positioning pins are disposed in at least two corner portions of the plurality of corner portions of the end surface respectively.

13. The motor according to claim 10,
wherein the second case portion comprises a board pressing portion which comes into contact with the circuit board from one side in the axial direction, and
wherein the board pressing portion is disposed to overlap the second board corner portion when viewed from the axial direction.

14. The motor according to claim 13, further comprising:
a plurality of the second board corner portions, and
a plurality of the board pressing portions.

15. The motor according to claim 13,
wherein the board pressing portion is made of rubber or resin.

16. The motor according to claim 10, further comprising:
a plurality of the first board corner portions; and
a plurality of the second board corner portions,
wherein the first board corner portions and the second board corner portions are alternately lined up in the circumferential direction.

17. The motor according to claim 10,
wherein a diameter of a circumscribed circle of the board outer-circumferential surface is larger than an outer diameter of the stator core, when viewed from the axial direction.

18. The motor according to claim 17,
wherein an inscribed circle of the board outer-circumferential surface overlaps the core outer-circumferential surface, when viewed from the axial direction.

19. The motor according to claim 1,
wherein the inner circumferential surface of the circumferential wall of the first case portion has a polygonal shape in the cross-sectional view,
wherein the first case portion comprises, on the inner circumferential surface, a plurality of case flat portions lined up in the circumferential direction,
wherein the case flat portions and the plurality of insulator flat portions face each other via a gap in the radial direction, and
wherein the at least one first detent are disposed at the case flat portions.

20. The motor according to claim 19,
wherein the number of the case flat portions and the number of the plurality of insulator flat portions are the same as each other.

21. The motor according to claim 19,
wherein an outer circumferential surface of the circumferential wall of the first case portion has a polygonal shape in the cross-sectional view.

* * * * *